(12) United States Patent
Konishi

(10) Patent No.: US 6,896,024 B2
(45) Date of Patent: May 24, 2005

(54) THERMO-WELDING EQUIPMENT USED FOR THERMOPLASTIC RESIN MOLED GOODS

(75) Inventor: Keiji Konishi, Fukushima (JP)

(73) Assignee: Munekata Co., Ltd., Fuskushima (JP)

( * ) Notice: Subject to any disclaimer, the term of this patent is extended or adjusted under 35 U.S.C. 154(b) by 0 days.

(21) Appl. No.: 10/793,471

(22) Filed: Mar. 4, 2004

(65) Prior Publication Data

US 2004/0250939 A1 Dec. 16, 2004

(30) Foreign Application Priority Data

Jun. 12, 2003 (JP) ........................................ 2003-167718

(51) Int. Cl.$^7$ .............................................. B30B 15/34
(52) U.S. Cl. ..................... 156/498; 156/581; 156/583.1
(58) Field of Search ................................ 156/293, 498, 156/500, 580, 581, 583.1; 100/315, 325, 326

(56) References Cited

U.S. PATENT DOCUMENTS 4,797,173 A * 1/1989 Gross et al. ................ 156/498
5,282,915 A * 2/1994 Westlake, Jr. ............... 156/243
5,843,274 A * 12/1998 Chou ......................... 156/582

FOREIGN PATENT DOCUMENTS

JP 4-19016 3/1992

* cited by examiner

Primary Examiner—James Sells
(74) Attorney, Agent, or Firm—McGlew and Tuttle, P.C.

(57) ABSTRACT

A thermo-welding device used for a thermoplastic resin molded goods is provided to drastically reduce cooling time and increase productivity. The device is used with a welding boss (5a) formed on the molded goods (5) made of thermoplastic resin inserted into a fixing hole 6a formed on the fixed object (6). A tip section of the welding boss (5a) projecting out from the fixing hole 6a is heated and fused to form an extended portion (5c) outside the fixed object (6) to apply to the welding boss (5a) of a molded good (5) in the thermo-welding device used for fixing the fixed object (6) to the molded good. In a portion of the periphery of a heating element having in a tip section thereof an applying side 21 to heat and fuse the welding boss 5a, a slit 23 is provided to exhaust air after the air cools the inside of the heating element 20. In addition, on a pipe 10 for supplying cooling air to the inside of this heating element 20 are formed a lengthwise hole 14 for blowing air onto the back of the applying side 21 of the heating element 20 and a widthwise hole 12 for blowing air onto the internal surface of the heating element 20 in the backward of the lengthwise hole 14. The widthwise hole 12 is located in a shifted position at an angle of not facing to said slit 23.

13 Claims, 12 Drawing Sheets

THERMO-WELDING EQUIPMENT USED FOR THERMOPLASTIC RESIN MOLED GOODS

FIELD OF THE INVENTION

The present invention relates to welding equipment used for thermoplastic resin molded good to form an expanded section, by inserting a welding boss formed on a molded good made from thermoplastic resin into a fixing hole formed on a fixed object, heating and fusing a tip section projecting out from the fixing hole for deformation in the pressurized state, providing an expanded section outside the fixed object for the purpose to fix the fixed object to the molded good.

BACKGROUND OF THE INVENTION

Generally, when a fixed object is fixed to a molded good made from thermoplastic resin, at first a welding boss monolithically formed on the molded good is inserted into a fixing hole formed on the fixed object. A tip section of the welding boss projecting from this fixing hole is then heated and fused to form an expanded section larger than the fixing hole, and the fixed object is fixed to the molded goods with this expanded section.

As an example of the fixing method described above, welding equipment for plastics and a welding method using the same are disclosed in Japanese Patent No. 1735109. This known welding equipment comprises a heating element generating heat with the electric resistance, a pair of electric cables, a pipe for blowing cooling air into the inside of the heating element, and a slit for exhausting the cooling air from the pipe formed on the heating element.

In the welding method using the welding equipment for plastics, a heating element is pressed to a tip section of a welding boss projecting out from a fixed hole, a voltage is loaded to the heating element to generate heat due to the electric resistance from the heating element so that the welding boss is heated and fused. At the same time, the welding boss is pressed for forming an expanded section thereon. Cooling air is then blown to the inside of the heating element, in the state where the welding equipment for plastics is pressed with the application of the voltage stopped. The expanded section of the fused resin is rapidly cooled and solidified to complete the thermo-welding work.

With the thermo-welding method described above, as the fixed object is cooled in the state where the fixed object is being pressed to a molding good to which the object is to be fixed, the expanded section is cooled without losing the close contact between the fixed object and the molding good. With this no clearance is generated in the welded portion and a fixed item with a stable quality and without bumpy movement due to welding can be obtained.

In the thermo-welding method described above, however, as a heating element is pressed to a tip section of the welding boss projecting out from a fixing hole and cooling air is blown to the heating element in the state for cooling, the heat capacity is required to become larger in association with an increase in the volume of the welding boss. Therefore, a long period of time is required, even when the cooling air is blown thereto, until the temperature drops to the room temperature. Although heating can be performed within a short period of time because Joule heat generated by applying a voltage to the heating element is used for heating, it is not easy to shorten the period required for cooling, and the time required for cooling occupies about 70% of all the time required for welding, which makes it difficult to shorten the time required for a thermo-welding work.

SUMMARY OF THE INVENTION

The present invention was made to solve the problem that a long period of time is required for cooling in a thermo-welding work using a thermo-welding equipment based on the conventional technology, and it is an object of the present invention to provide a thermo-welding equipment capable of reducing the time required for cooling.

In the case of a welding equipment used for fixing a fixed object to a molded good, a welding boss formed on a molded good made of thermoplastic resin is inserted into a fixing hole formed on the fixed object. A tip section projecting out from the fixing hole is heated and fused for forming an expanded section outside the fixed object. The configuration is made so that in a portion of the periphery of a heating element having an applying side in a shaped section thereof for applying onto the welding boss of the molded good and for heating and fusing the welding boss there is provided a slit for discharging air from the inside of the heating element to the outside after the air is used for cooling. A pipe for supplying cooling air to the inside of this heating element is provided in a lengthwise hole for blowing air onto the back of the applying side and a widthwise hole is provided for blowing air onto the internal surface of the heating element in a shifted position at an angle of not facing to said slit.

With the configuration described above, a heating element comprised of a thermo-welding equipment used for fixing a fixed object to a molded good is applied to a welding boss of the molded good and has an applying side in a shaped section thereof for heating and fusing the welding boss. Further, on the side of the heating element there is provided a slit for the purpose of an effective discharging of air after its used for cooling, from the within the heating element to the outside, as well as of an efficient heat generation so that the current of electricity flows on the applying side under control. Thus the number of slits is preferably at least two or more.

Further, the heating element is electrically connected to a pair of lead wires for energizing through the slit by means of welding or the like, thus enabling the heating element to generate heat with Joule heat by applying a voltage from a power supply equipment via the lead wires.

A pipe is held at a prespecified position inside the heating element by attaching into a through hole formed in a supporting member. The pipe functions having an objective of spraying air into the heating element's inside to cool the heating element and fused resin. For this purpose, a plurality of openings is provided in a position near the applying side on a pipe in order to spray air into a lengthwise hole to provide air flowing in the direction of the backside of the applying side of the heating element and into a widthwise hole for flow in the direction of the back of the side of the same.

Air fed in the pipe is thus blown straightforwardly onto the back of the base of the heating element and at the same time is blown onto the back of the side of the heating element near the applying sides. In turn the air flows toward the slit, cooling the entire heating element and resulting in an accelerated cooling velocity.

Next, in the pipe described above, the lengthwise hole and the widthwise hole provided in a position near the applying side of the heating element are designed so that the internal diameter of the lengthwise hole is smaller than that of skid widthwise hole.

With this configuration, the lengthwise hole provided in the pipe extending from a branch point with the widthwise hole through a pipe opening has the internal diameter smaller than that of the widthwise hole. Air fed into the pipe is thus restricted to flow straight because the internal diameter of the lengthwise hole toward the pipe opening is smaller than that of the widthwise hole, enabling the air to be conducted to the widthwise hole.

Next, the thermo-welding equipment used for fixing a fixed object to a molded good involves inserting a welding boss formed on a molded good made of thermoplastic resin into a fixing hole formed on the fixed object, heating and fusing a tip section projecting out from the fixing hole for forming an expanded section outside the fixed object. The configuration is made so that in a portion of the periphery having an applying side in a shaped section thereof for applying onto the welding boss of the molded good and for heating and fusing the welding boss, a slit is provided for discharging air from the inside of the heating element to the outside after the air is used for cooling, and further a pipe for blowing air to the inside of the heating element is provided to cool the heating element. A supporting member is provided wherein the tip of said pipe is inserted into the rear end of a through hole. In a portion of the tip section of this supporting member there is formed a smaller diameter section to maintain a gap with the internal backside of the heating element. Further, in the smaller diameter section, a lengthwise hole to blow air onto the backside of the heating element leading to the through hole as well as a widthwise hole to blow air into the side of the heating element are provided in a position near the backside of the applying side. A widthwise hole of the supporting element and a slit of said heating element are set in a position not facing toward each other.

In this thermo-welding equipment, the supporting member having a through hole to fix the pipe in a prespecified position in terms of said heating element comprises a larger diameter section and a smaller diameter section. The external size of the smaller diameter section is formed to be suitably smaller than the internal diameter of the heating element with which the smaller diameter section makes an appropriate gap. In the smaller diameter section in a position near the applying side there is provided a widthwise hole leading to said through hole to further open to the side of the smaller diameter section. Air fed into the pipe thus blows straight onto the backside of the heating element's base and at the same time is led to the widthwise hole reaching the side of the smaller diameter hole and simultaneously blows onto the back of the side of the heating element near the applying side.

The air further flows along the face of a wall toward the slit to cool the entire heating element, resulting in an accelerated cooling velocity.

Next, as for the lengthwise hole and the widthwise hole provided in the supporting member, the internal diameter of the lengthwise hole is made to be smaller than that of the widthwise hole.

In this thermo-welding equipment, the internal diameter of the through hole of the supporting member is designed to be smaller than that of the widthwise hole from an area extending from the intersection point between the through hole and the widthwise hole to the pipe opening section so that air flow in the straight direction is restricted allowing control of the air flow into the widthwise hole.

Next, together with the lengthwise hole provided on the supporting member, an oblique hole is provided at a corner near the applying side's back of the heating element to blow air.

With this configuration, in the supporting member are formed the lengthwise hole to blow cooling air to the applying side's back following the through hole as well as the oblique hole to blow air to the side near the applying side's back. As a result, it is possible to jet cooling air to an edge between the applying side and the side contacting therewith, and, after the air cools a broad portion of the heating element with high temperature, it further flows toward the slit to cool the entire heating element, resulting in an accelerated cooling velocity.

Next, a spray nozzle for spraying cooling water mixed with air is provided.

With this configuration, as the spray nozzle is provided in the pipe, cooling water provided from the outside becomes mist in the pipe and the mist can be sprayed from a plurality of openings thereof to the inside of the heating element. As a result, heat is deprived of the heating element due to the heat of vaporization of the mist, resulting in an accelerated cooling velocity.

Next, a spray nozzle for spraying cooling water to the inside of the heating element.

With this configuration, it is possible to cool the heating element mixing cooling air with mist from a feed water equipment provided outside via a spray nozzle, resulting in an efficient cooling.

Next, to a spray nozzle is connected a feed water equipment capable of intermittently supplying cooling water.

With this configuration, it is possible to control mist generation so that the state where mist becomes saturated can be prevented within the pipe and the heating element. Hence a large particle diameter of mist is not likely to be formed owing to the bonding of mist particles, which enables the generation of mist with a uniform particle diameter.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
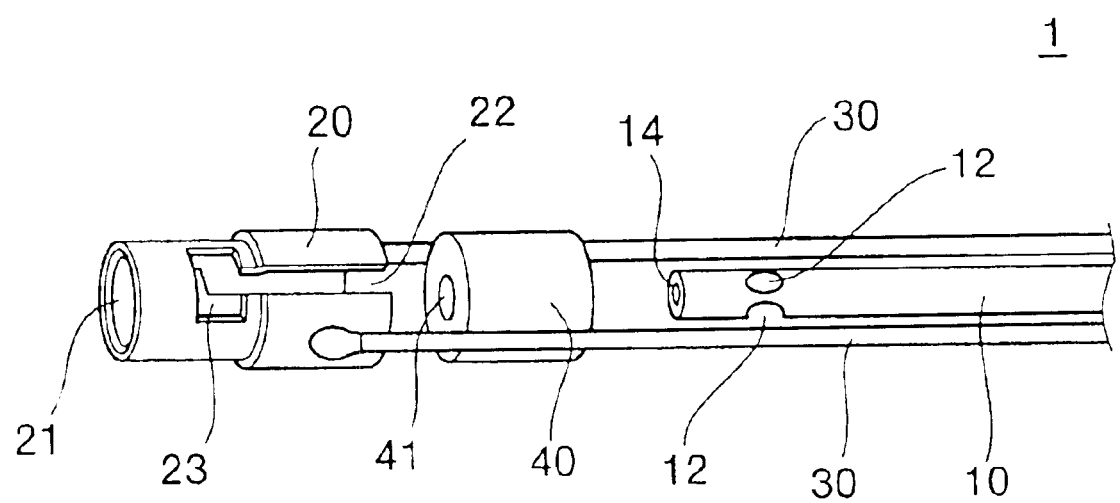
FIG. 1 is an explanatory view showing the state just before assembly of thermo-welding equipment according to Example 1 of the present invention.

Referring to the drawings in particular, thermo-welding equipment used for a thermo-plastic resin molded goods according to the present invention makes use of a structure capable of blowing cooling air onto the entire backside of a heating element or of blowing cooling air mixed with mist converted from cooling water onto the same.

Examples of the present invention are described below.

EXAMPLE 1

An example wherein a widthwise hole is formed on the pipe is described below.

Figure 2:
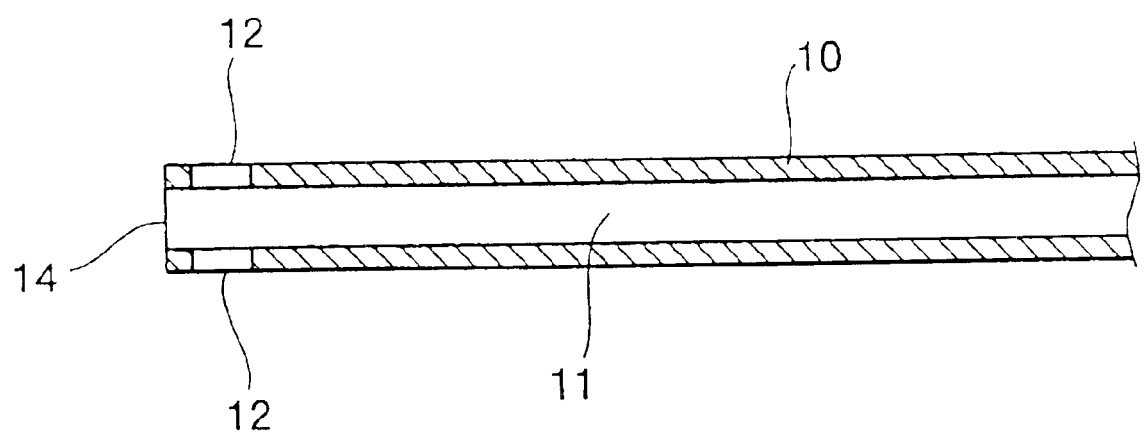
FIG. 2 is a cross-sectional view showing a pipe 10 in Example 1.
Figure 3:
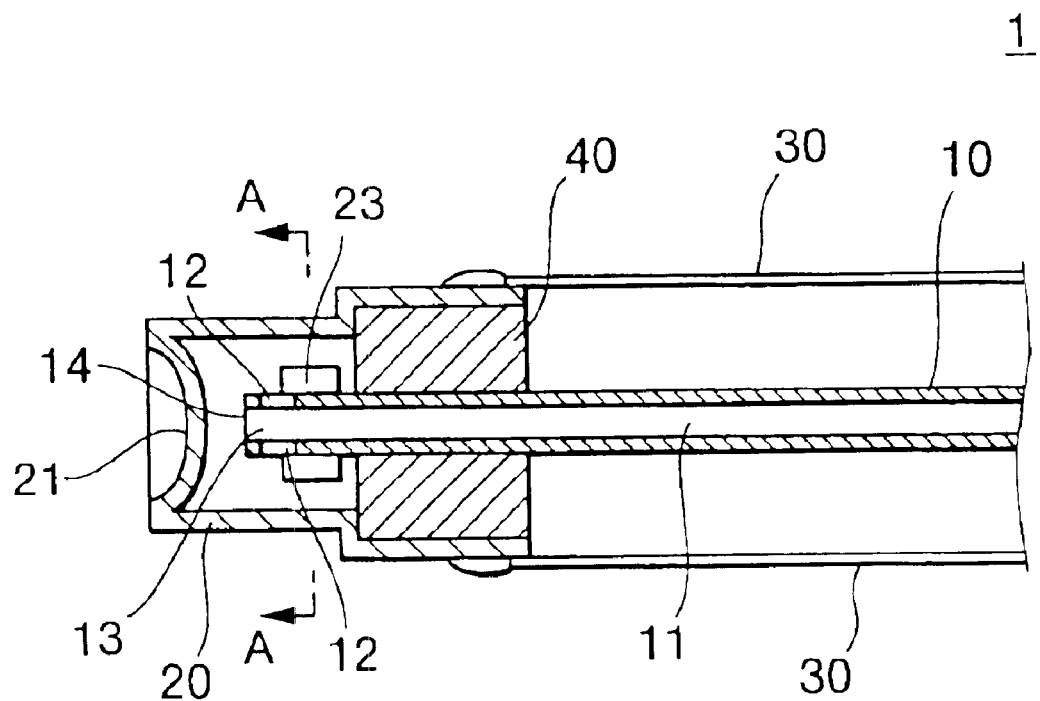
FIG. 3 is a cross-sectional view showing the thermo-welding equipment 1 in Example 1.

FIG. 1 is an explanatory view showing the state just before assembly of a thermo-welding equipment 1 according to Example 1, FIG. 2 is a cross-sectional view showing a pipe 10, and FIG. 3 is a cross-sectional view showing the thermo-welding equipment 1 in the state where assembly thereof is completed.

In FIG. 1, the reference numeral 20 indicates a heating element for generating heat by applying a voltage. The heating element 20, two-tired as a whole, has a cylinder-like form and, in case of this example, is formed by means of cutting stainless steel. The heating element 20 on the front side thereof forms a concavely curved applying side 21 and the rear side thereof is opened. On the side thereof is provided a slit 22 in two spots facing to each other to let cooling air flow to the outside. Further near the applying side 21 of the slit 22 is formed a slit enlarged section 23 which is made to be larger than the slit 22 to improve efficiency of air exhaustion.

The reference numeral 30 indicates a pair of electric cables electrically connected to the heating element by means of welding or the like. As the current of electricity supplied from the electric cables 30 is controlled to flow to the applying side 21 with the slit 22, it is possible to generate heat efficiently. The reference numeral 10 indicates a pipe for blowing cooling air to the backside of the heating element while the reference numeral 40 indicates a supporting member made of insulation material provided thereon a through hole 41 for fixing a pipe at k a prespecified position within the heating element 20.

The pipe 10 comprises, as shown in FIG. 2, in a projecting portion from the supporting member 40 to the backside of the heating element 20, a widthwise hole 12 leading to a cavity 11 in the pipe 10 and opening to the side of the pipe 10 in a position near the back of the applying side 21 of the heating element 20. Further the position of this widthwise hole 12 is set so as to be nearer to the tip section than the slit expanded section 23 and so as not to face the same to each other.

Across section of the thermo-welding equipment 1 assembled with each member described above is shown in FIG. 3. In the pipe 10 projecting out from the supporting member 40 to the inside of the heating element 20, the configuration is made so that cooling air 50 blows from three points, namely, a pair of widthwise holes 12 and the opening section 14. Further it is preferable that the spatial position of the widthwise hole 12 on the pipe 10 and the slit 22 of the heating element 20 is different from each other and in this example the widthwise hole 12 relative to the slit 22 is placed at an angle of 90 degrees. According to the configuration of the thermo-welding equipment 1, an adequate relative position at other angles such as 45 or 60 degrees can be chosen.

As a result, cooling air 50 blown from the widthwise hole 12 is not discharged instantly from the slit enlarged section 23 to the outside but flows along the backside of the heating element 20 and then is discharged to the outside, which results in efficient cooling.

Next, an example for the use of the thermo-welding equipment 1 according to the Example 1 is described below.

Figure 4A:
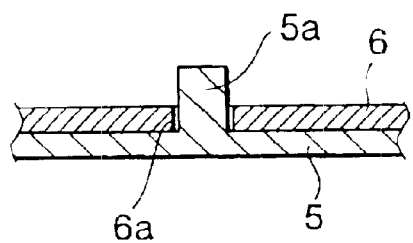
FIGS. 4a–4d is an explanatory view showing the thermo-welding work in Example 1.
Figure 4B:
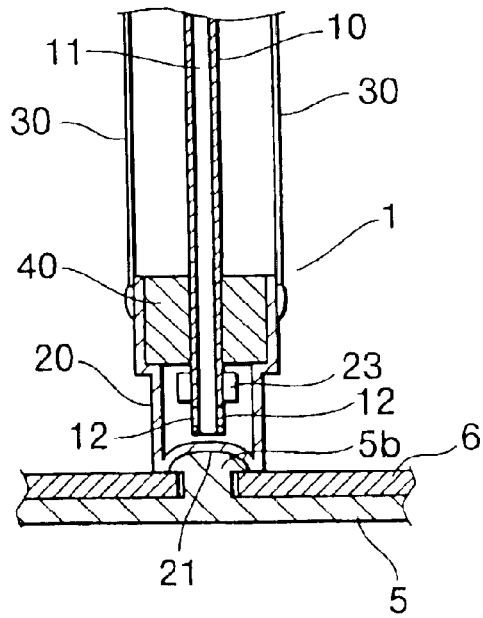
Figure 4C:
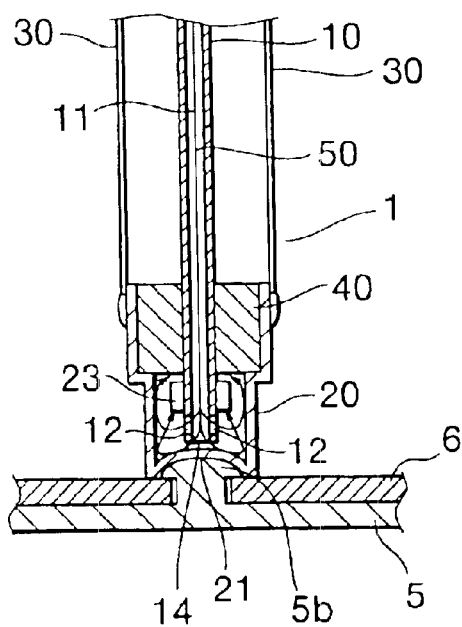
Figure 4D:
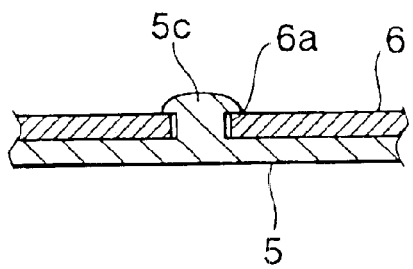
Figure 5:
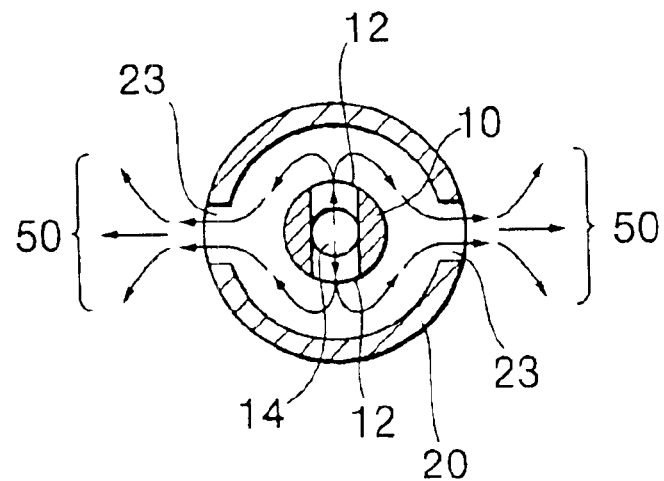
FIG. 5 is an explanatory view showing the flow of cooling air 50 taken along the line A—A in the cross section of FIG. 3.

FIGS. 4(a) to 4(d) are explanatory views showing the thermo-welding work while FIG. 5 is an explanatory view showing the flow of cooling air 50 taken along the line A—A in the FIG. 3.

First, as in FIG. 4(a), a welding boss 5a monolithically formed on the molded goods 5 (made of polypropylene (PP)) is inserted into a fixing hole 6a formed by perforation on the fixed object 6, then a tip section of the welding boss 5a is made to project out from the surface of the fixed object 6. Next, while an applying side 21 on, a thermo-welding equipment 1 is pressed without a break to a tip section of the welding boss 5a with an appropriate pressing force, a voltage is loaded from power supply equipment (not shown) to a pair of electric cables 30 so that the heating element 20 generates heat due to the electric resistance to heat the welding boss 5a. When resin of the welding boss 5a reaches the temperature to fuse, as shown in FIG. 4(b), the welding boss 5a is crushed owing to the pressing force and is accordingly charged into the entire applying side 21 to serve as a fused section 5b.

After the voltage loading is stopped and the fused section 5b is well fused with the remaining heat, cooling air 50 is supplied to a pipe 10 (FIG.: 4(c)). The cooling air 50 is blown from an opening section 14 of the pipe 10 and a pair of widthwise holes 12 to the inside of the heating element 20. The cooling air 50 blown from the opening section 14 cools the back of an applying side 21 on the heating element 20, while the cooling air 50 blown from the widthwise holes cools the back of the side on the heating element 20 to direct the air to a slit expanded section 23 so that the cooling air 50 warmed up by the heat of the heating element 20 is discharged to the outside. The state described above is shown 50 in FIG. 5.

When the fused section 5b is fused sufficiently for resin thereof to solidify, supply of cooling air 50 is stopped and the thermo-welding equipment 1 is drawn out so that a solidified expanded section 5c, as shown in FIG. 4(d), is formed, making the molded goods 5 and the fixed object 6 fixed.

Cooling time according to Example 1 is shown in Table 1.

EXAMPLE 2

Figure 6:
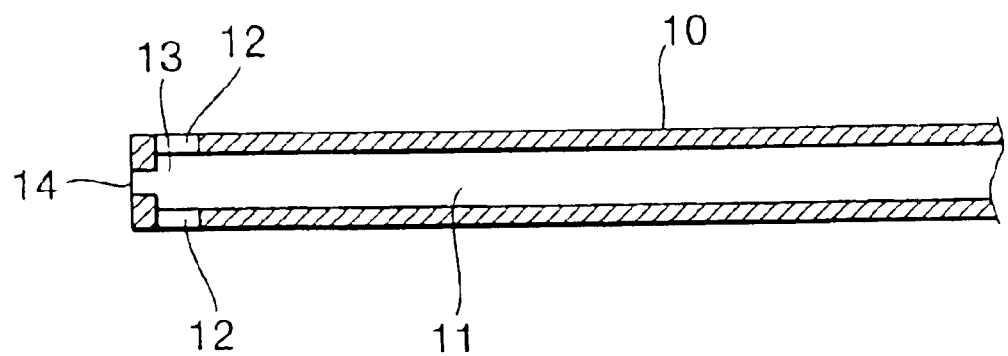
FIG. 6 is a cross-sectional view showing a pipe 10 in Example 2.

The pipe 10 of the thermo-welding equipment 1 is described in Example 1, in this Example 2, as shown in FIG. 6, the internal diameter of a lengthwise hole 13 in the portion from an intersection point between a cavity 11 of the pipe 10 and the widthwise hole 12 to the opening section 14 is designed to be smaller than that of the widthwise hole 12. The lengthwise hole 13 and the widthwise hole 12 have such a diameter size as described above that air flow resistance in the straight direction can be increased enabling the air flow into the widthwise hole 12 to be controlled.

EXAMPLE 3

Figure 7:
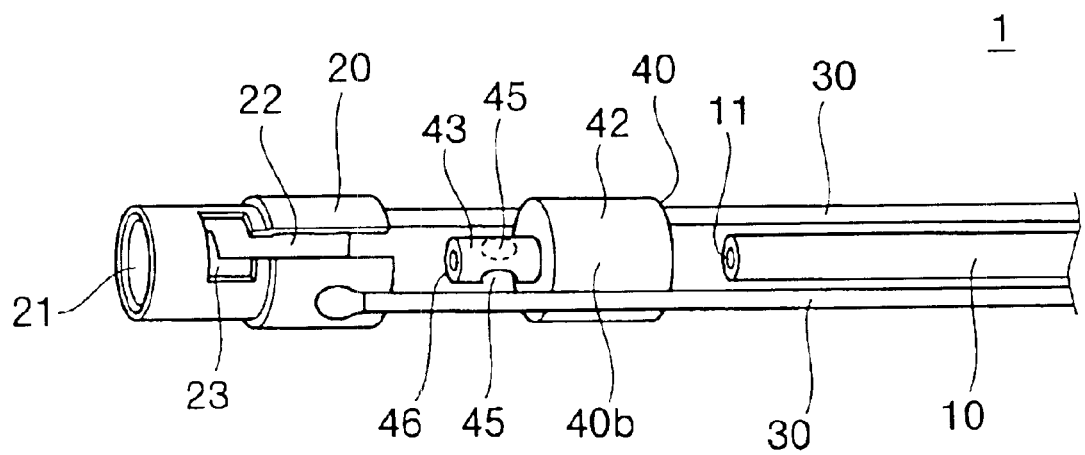
FIG. 7 is an assembly view showing the thermo-welding equipment 1 according to Example 3.

An example of forming a widthwise hole on a supporting member is described below. FIG. 7 is an explanatory view showing the state just before assembly of the thermo-welding equipment 1 according to Example 3, FIG. 8 is a cross-sectional view showing a supporting member 40, and FIG. 9 is a cross-sectional view showing the thermo-welding equipment 1 in the state where assembly thereof is completed.

As a heating element 20 and electric cables 30 according to this Example 3 are exactly the same as those in Example 1, a pipe 10 and a supporting member 40 which are different from those in Example 1 are described below.

On the pipe 10 according to Example 1 there is provided a widthwise hole 12 leading to a cavity 11, while on the pipe 10 according to Example 3 there is provided only a cavity 11 without widthwise hole.

Figure 8:
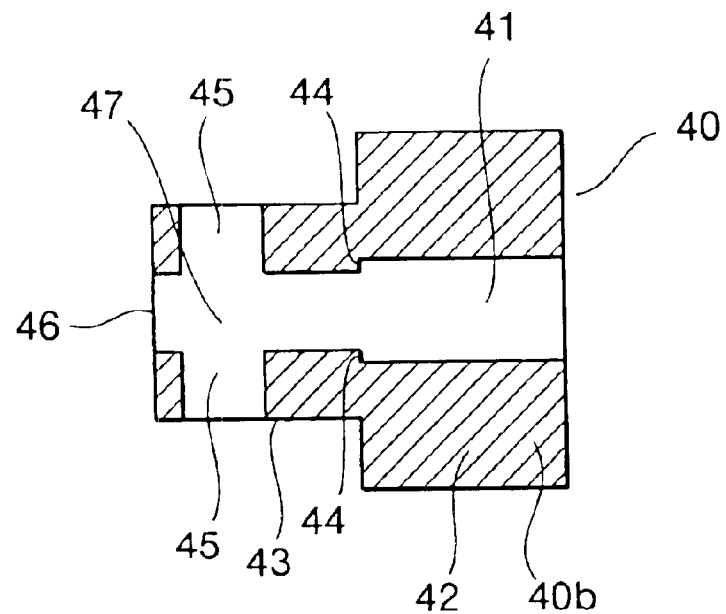
FIG. 8 is a cross-sectional view showing a supporting member 40 in Example 3.
Figure 9:
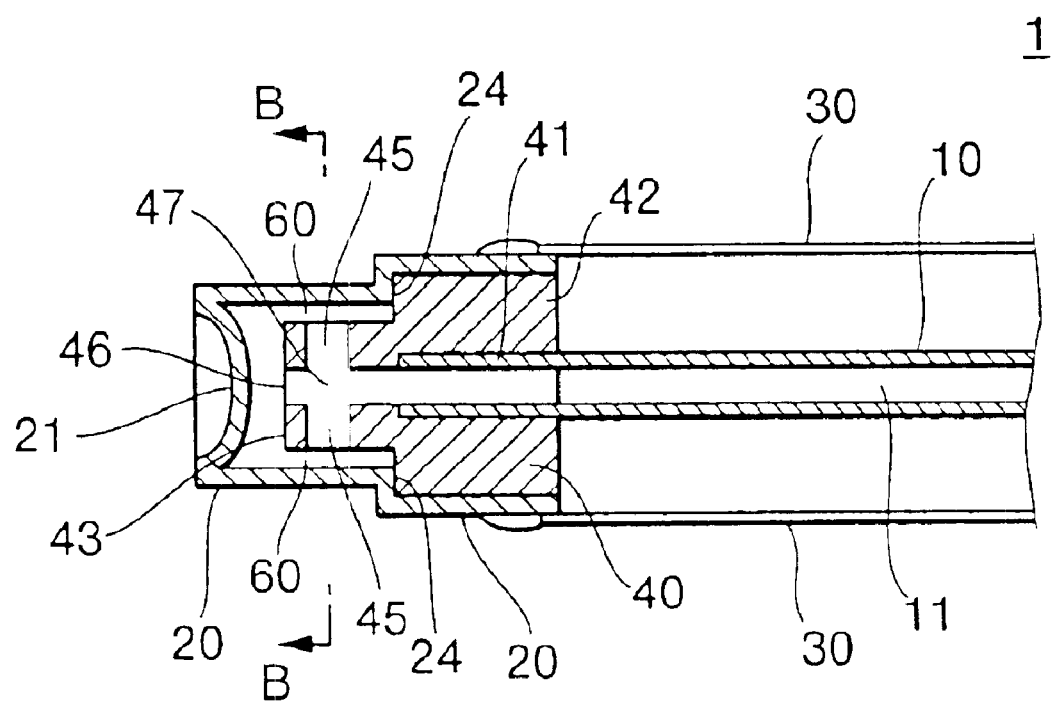
FIG. 9 is a cross-sectional view showing the thermo-welding equipment 1 in Example 3.

The supporting member 40 is described according to FIG. 8. The supporting member 40 comprises a larger diameter section 42 providing a through hole 41 to attach the pipe 10, and a smaller diameter section 43.

The smaller diameter section 43 has a diameter as shown in FIG. 9 that is smaller than the internal diameter of a heating element 20 in order to form a gap 60 on the back of the heating element 20. For example, the internal diameter of the heating element 20 is 18 mm so that the diameter of the smaller diameter section 43 is made to be 14 mm. As a result, the gap 60 between the smaller diameter section 43 and the back of the heating element is to be 2 mm. When the gap 60 is too narrow, although the cooling effect will be as good as expected, flow resistance increases, adversely affecting the prospect of a reduced cooling time. In the meantime, when the gap 60 is too large, air which does not contribute to cooling (flowing apart from the back of the heating element) is generated, resulting in a poor cooling effect.

Inside the smaller diameter section 43 there are formed a shoulder 44, a widthwise hole 45 leading to the shoulder 44 and opening to the side of the smaller diameter section 43 in a position near an applying side 21, a lengthwise hole 47 leading to an opening section 46 opening to the end face of the smaller diameter section 43 from an intersection point between the widthwise hole 45 and the shoulder 44, and the like.

A cross section of the thermo-welding equipment 1 assembled with each member described above is shown in FIG. 9. The supporting member 40 is positioned in a manner that the larger diameter section 42 is mounted on a restricted section 24 of the heating element 20, and a gap 60 of 2 mm in width is formed between the smaller diameter section 43 and the back of the heating element 20 as described above.

As a result, the configuration is made so that cooling air 50 blows from three points, namely, a pair of widthwise holes 45 and the opening section 46 each on the supporting member 40. Further it is preferable that the widthwise hole 45 on the supporting member 40 and the slit 22 of the heating element 20 take different spatial positions and in this example the two positions cross at an angle of 90 degrees. Thus cooling air 50 blown from the widthwise hole 45 is not discharged instantly from the slit enlarged section 23 to the outside but flows along the backside of the heating element 20 and then is discharged to the outside, which results in efficient cooling.

It is to be noted that the slit expanded section 23 is omitted in FIG. 9 because of being situated in the backside of the smaller diameter section 43 in the supporting member 40.

Next, an example for the use of the thermo-welding equipment 1 according to the Example 3 is described below.

Figure 10A:
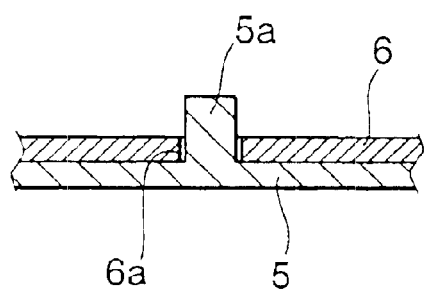
FIGS. 10a–10d is an explanatory view showing the thermo-welding work in Example 3.
Figure 10B:
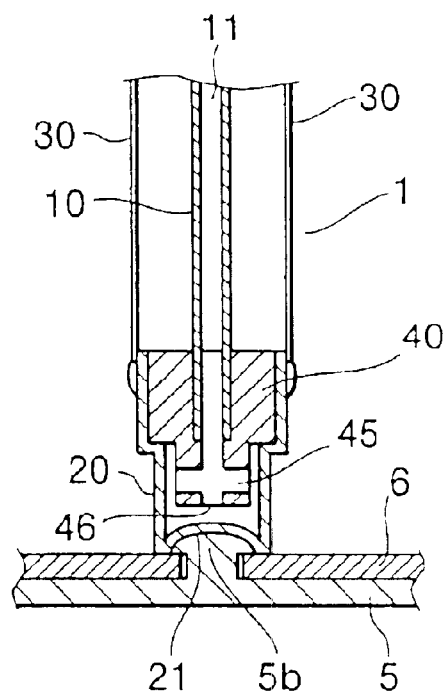
Figure 10C:
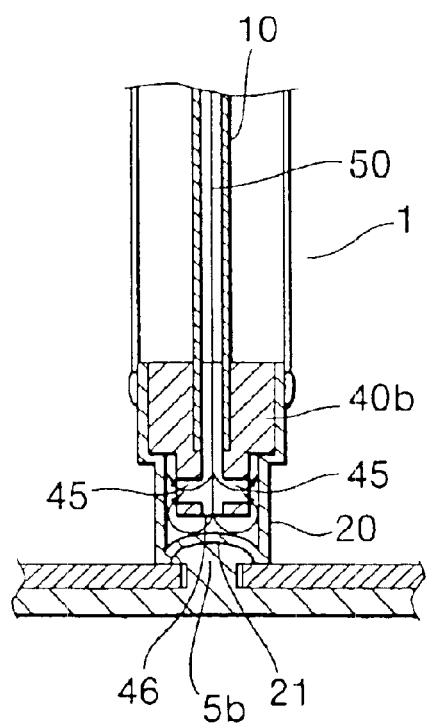
Figure 10D:
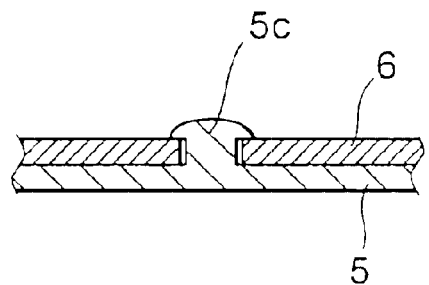
Figure 11:
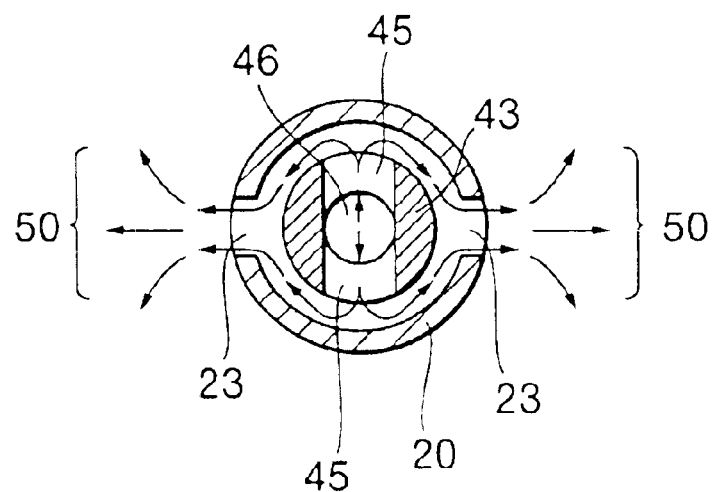
FIG. 11 is an explanatory view showing the flow of cooling air 50 taken along the line B—B in the cross section of FIG. 9.

FIGS. 10(a) to 10(d) are explanatory views showing the thermo-welding work, while FIG. 11 is an explanatory view showing the flow of cooling air 50 taken along the line B—B in the FIG. 9.

First, as in FIG. 10(a), a welding boss 5a monolithically formed on the molded goods 5 (made of polypropylene (PP)) is inserted into a fixing hole 6a formed by perforation on the fixed object 6, then a tip section of the welding-boss 5a is made to project out from the surface of the fixed object 6. Next, while an applying side 21 on the thermo-welding equipment 1 is pressed without a break to a tip section of the welding boss 5a with an appropriate pressing force, a voltage is loaded from a power supply equipment (not shown) to a pair of electric cables 30 so that the heating element 20 generates heat due to the electric resistance to heat the welding boss 5a. When resin of the welding boss 5a reaches the temperature to fuse, as shown in FIG. 10(b), the welding boss 5a is crushed owing to the pressing force and is accordingly charged into the entire applying side 21 to serve as a fused section 5b.

After the voltage loading is stopped and the fused section 5b is well fused with the remaining heat, cooling air 50 is supplied to a pipe 10 (FIG. 10(c)). The cooling air 50 is blown from an opening section 46 and a pair of widthwise holes 45 each on the supporting member 40 to the inside of the heating element 20. The cooling air 50 blown from the opening section 14 cools the back of the applying side 21 on the heating element 20, while the cooling air 50 blown from the widthwise hole 45 cools the back of the side on the heating element 20 to direct the air to a slit expanded section 23 so that the cooling air 50 warmed up by heat of the heating element 20 is discharged to the outside. The state described above is shown in FIG. 11. When the fused section 5b is fused sufficiently for resin thereof to solidify, supply of cooling air 50 is stopped and the thermo-welding equipment 1 is drawn out so that an expanded section 5c, as shown in FIG. 10(d), is formed, making the molded goods 5 and the fixed object 6 fixed.

The cooling time according to Example 3 is shown in Table 1.

EXAMPLE 4

Figure 12:
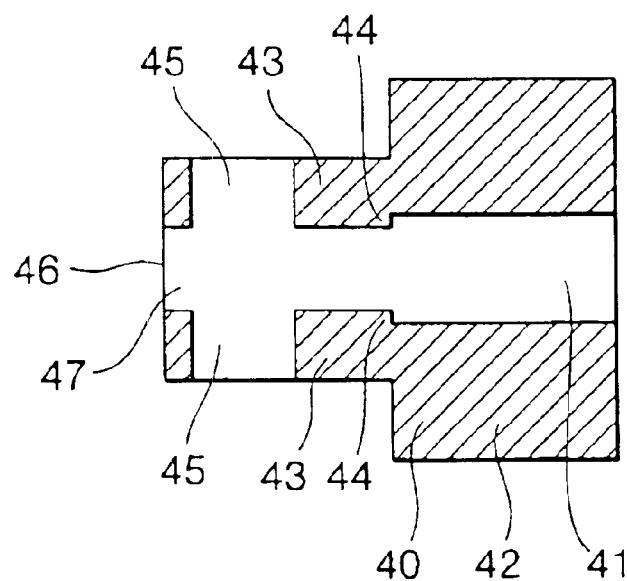
FIG. 12 is a cross-sectional view showing a supporting member 40 in Example 4.

As to, the supporting member 40 of the thermo-welding equipment 1 described in Example 3, in this Example 4, as shown in FIG. 12, the internal diameter of a lengthwise hole 47 in the portion from an intersection point between a through hole 41 and the widthwise hole 45 to the opening section 46 is designed to be smaller than that of the widthwise hole 45. The lengthwise hole 47 and the widthwise hole 45 have such a size of diameter as described above that air flow resistance in the straight direction can be increased enabling the air flow into the widthwise hole 45 to be controlled.

EXAMPLE 5

Figure 13:
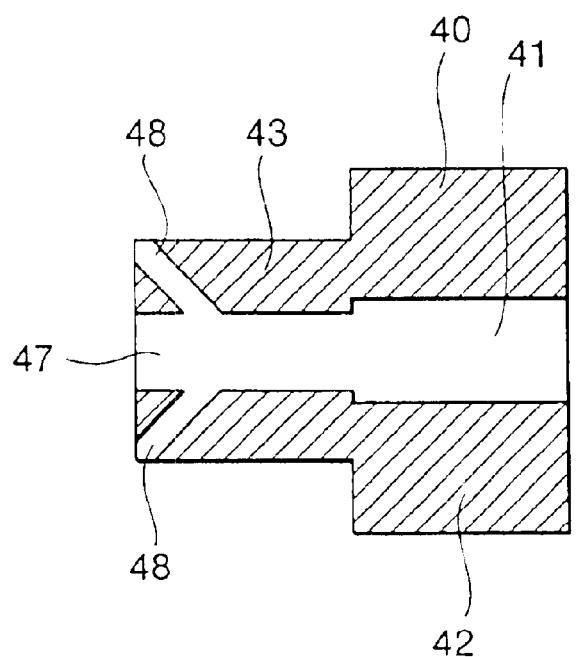
FIG. 13 is a cross-sectional view showing a supporting member 40 in Example 5.

As to the supporting member 40 of the thermo-welding equipment 1 described in Example 3, in this Example 5, as shown in FIG. 13, a lengthwise hole 47 to blow cooling air 50 onto the back of an applying side 21 following a through hole 41 as well as an oblique hole 48 to blow the same to and around the side of the applying side's back are formed at a position near the applying side 21. As a result, cooling air 50 can be blown to an edge (a corner area) between the applying side 21 and the side contacting therewith, and, after cooling air 50 cools a broad portion with high temperature of the heating element 20, cooling air 50 further flows toward the slit 22 to cool the entire heating element 20, resulting in an accelerated cooling velocity.

COMPARATIVE EXAMPLE 1

Figure 14:
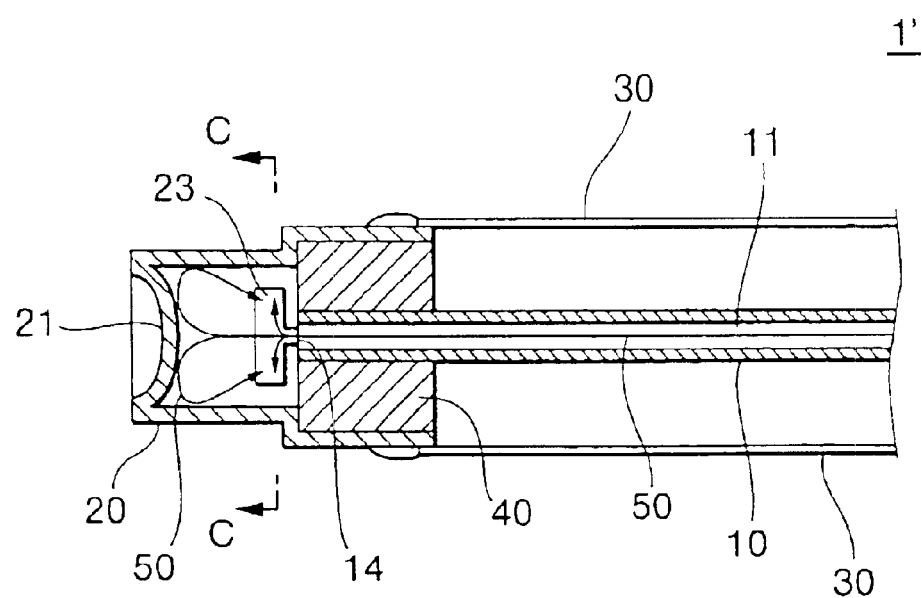
FIG. 14 is a cross-sectional view showing the thermo-welding equipment 1 based on the conventional technology according to Comparative Example 1.
Figure 15:
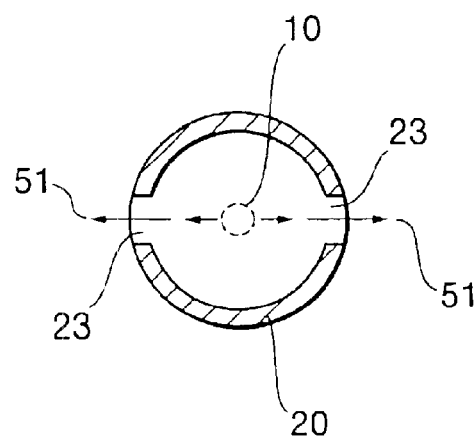
FIG. 15 is an explanatory view showing the flow of cooling air 50 taken along the line C—C in the cross section of FIG. 11.

As an comparative example, a thermo-welding equipment 1' based on the conventional technology is described below. FIG. 14 is a cross section showing the thermo-welding equipment 1' based on the conventional technology and FIG. 15 is a cross section showing FIG. 14 taken along the line C—C.

The greater part of cooling air 50 blown from the opening section 14 on the pipe 10 flows toward the back of the applying side 21 on the heating element 20, and is then discharged from the slit expanded section 23 to the outside. Further, even if cooling air 50 flows from the opening section 14 toward the back of the heating element's side 20, as shown in FIG. 15, cooling air 50 turns into the air 51 which is just released to the outside without contributing to cooling. As described above, the prior art is deficient in the point that not all of cooling air 50 works effectively even when blown to cool the heating element 20.

Cooling time according to Comparative Example 1 is shown in Table 1.

Generating heat by the heating element is performed as shown below in a measurement method of air cooling time in each Example.

| First heating | Interval time | Second heating | Interval time | Third heating | Welding time | Start cooling |
|---|---|---|---|---|---|---|
| 2.00 | 2.00 | 0.40 | 2.00 | 0.40 | 4.00 | (sec) |

The temperature of the heating element was about 280° C. when cooling started. Cooling time was measured as a period from the time when cooling started to the time when the temperature of the heating element returned to be 40° C. The flow amount of cooling air was 150 NL/min.

TABLE 1

| | Cooling medium | Cooling time (s) | Time shortened (~) |
|---|---|---|---|
| 1 | Example 1 | 7.45 | 21 |
| 2 | Example 3 | 7.10 | 24 |
| 3 | Comparative Example 1 | 9.45 | base |

Figure 16:
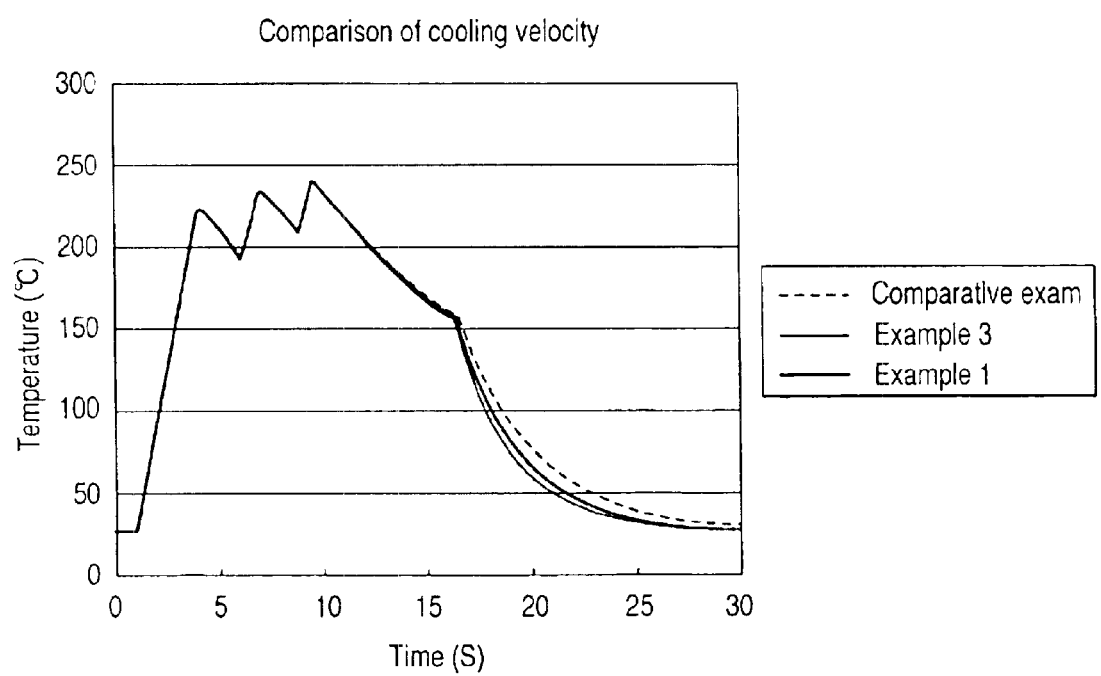
FIG. 16 is a graphic chart showing a comparative example of cooling velocity in Example 1, Example 3 and Comparative Example 5.

FIG. 16 shows the temperature change of cooling time according to Example 1, Example 3 and Comparative Example 1.

EXAMPLE 6

Figure 17:
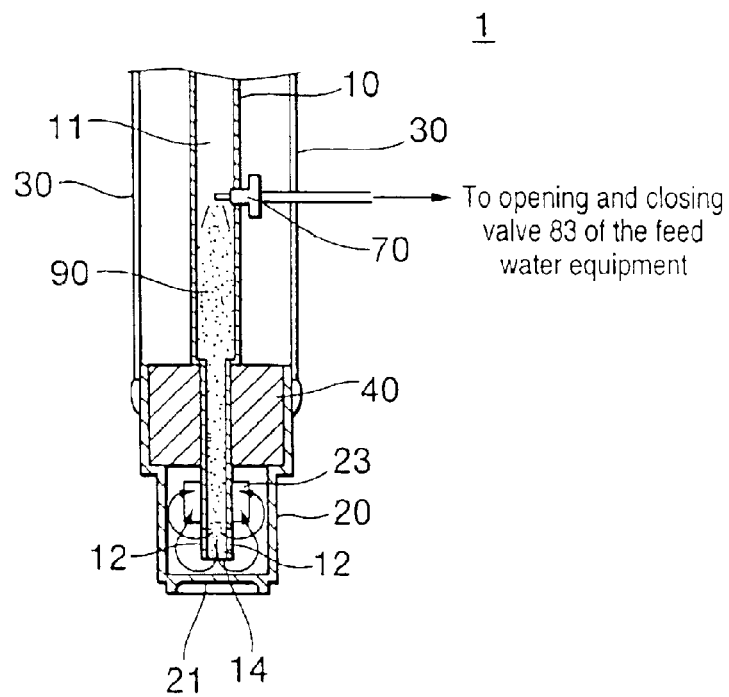
FIG. 17 is a cross-sectional view showing the thermo-welding equipment 1 according to Example 6.
Figure 18:
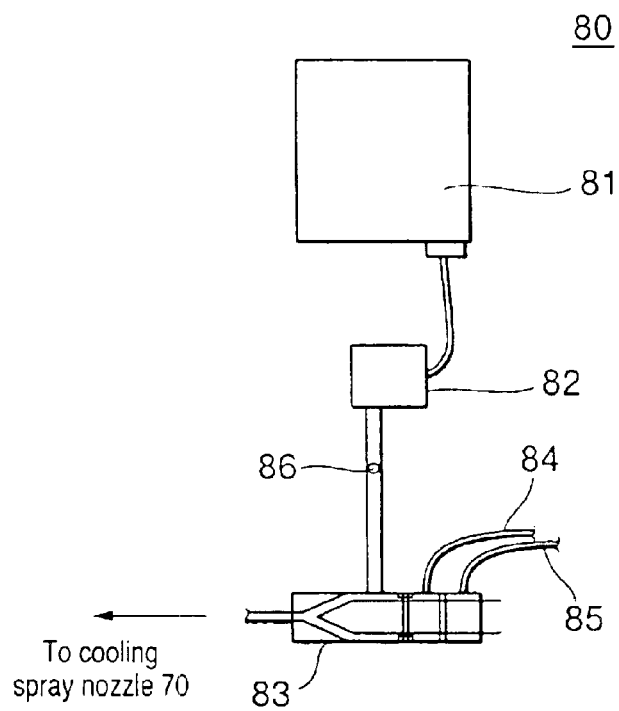
FIG. 18 is an explanatory view showing the feed water equipment 80 connected to the thermo-welding equipment 1 in Example 6.

An example according to another aspect of the invention is described below. FIG. 17 is an assembly cross-sectional view showing the thermo-welding equipment 1 according to Example 6, and FIG. 18 is an explanatory view showing a feed water equipment 80 connected to said thermo-welding equipment 1.

The basic configuration of the thermo-welding equipment 1 described in Example 6 is the same as that of Example 1. The configuration of Example 3 also works in the same way.

This Example 6 is characterized in that a spray nozzle 70 is provided in a pipe 10. As shown in FIG. 17, the spray nozzle 70 is attached to the side of the pipe 10 so that a tip section of the spray nozzle 70 is situated at the center of a cavity 11 in the pipe 10. The form of the tip section of the spray nozzle 70 is cut at the center of a cavity 11 in FIG. 17, while the L-shaped form of the tip section to turn the nozzle in the downstream direction is more effective for generating mist.

The feed water equipment 80 is described below according to FIG. 18. The reference numeral 81 indicates a water tank 81 for storing cooling water, and in this Example distilled water is used as cooling water taking an influence to the heating element 20 into consideration. The cooling water in the water tank 81 is sent to a valve 83 via a water pressure generating pump 82 for generating water pressure. As the pressure of cooling air 50 is about 0.5 MP in this Example, the water pressure from the water tank 81 is raised to about 0.7 MP with the water pressure generating pump 82 because of the necessity to prevent cooling water from flowing backward to a water route. As the valve 83 is required to control cooling water even with very little flow amount, a needle valve is used in this Example for controlling the flow. The valve 83 opens and closes by supplying air to an air control opening 'ON' 84 of the needle valve and an air control opening 'OFF' 85 of the needle valve respectively, enabling continuous opening and closing operation.

While cooling air 50 is sent into the pipe 10, supply of cooling water from a spray nozzle 70 into the pipe 10 generates mist. When cooling medium comprised of cooling air 50 and mist 90 is blown to the heating element 20, the effect of cooling air as well as cooling effect of mist 90 due to vaporization latent heat are multiplied, depriving heat of the heating element 20 to increase the cooling effect.

The reference numeral 86 indicates a feed water filter.

Cooling velocity was measured using the thermo-welding equipment 1 attached with the spray nozzle 70 to the pipe 10 as well as the feed water equipment 80 as described above. Results of the measurement are shown in Table 2.

The following three types of cooling medium were used.
1. Mixture of cooling air (150 NL/min) and cooling water (spraying time 1.5 sec, spraying amount 0.375 cc)

2. Mixture of cooling air (150 NL/min) and cooling water (spraying intermittent time 1.0+0.1+0.1 sec, total spraying amount 0.300 CC)
3. Cooling air only (150 NL/min).

Generating heat by the heating element is performed as shown below in a measurement method of air cooling time in each cooling 5 medium.

| First heating | Interval time | Second heating | Interval time | Third heating | Welding time | Start cooling |
|---|---|---|---|---|---|---|
| 2.00 | 2.00 | 0.40 | 2.00 | 0.40 | 4.00 | (sec) |

The temperature of the heating element was about 280° C. when cooling started. Cooling time was measured as a period from the time when cooling started to the time when the temperature of the heating element returned to be 40° C.

The flow amount of cooling air was 150 NL/min.

TABLE 2

| | Cooling medium | Cooling time (s) | Time shortened (~) |
|---|---|---|---|
| 1 | cooling air + cooling water | 2.2 | 76 |
| 2 | cooling air + cooling water (intermittent) | 4.6 | 50 |
| 3 | cooling air only | 9.2 | base |

Figure 19:
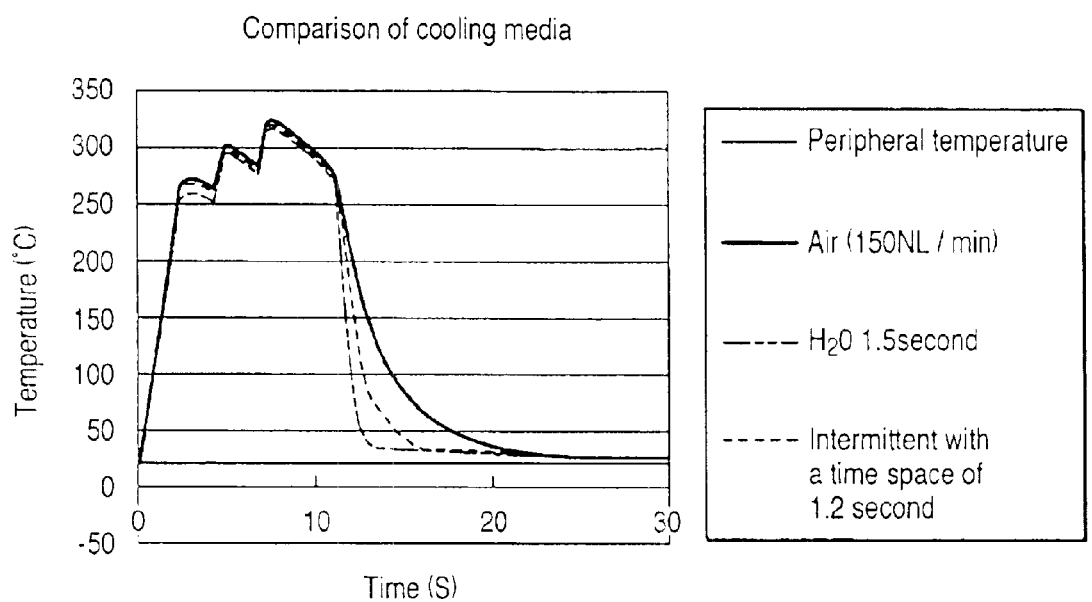
FIG. 19 is a graphic chart showing a comparative example of cooling velocity in cooling medium in Example 6.

FIG. 19 shows the temperature change of cooling time according to each cooling medium.

In this Example 6, the method to continuously supply cooling water for 1.5 seconds was most effective for cooling, while according to the form of a heating element or other conditions, either the continuous feed water method or the instantaneously-intermittent feed water method can be chosen.

It is to be noted that the supply timing of cooling water as described above is one example for illustration, and the optimal cooling can be obtained by controlling the needle valve according to various conditions.

EXAMPLE 7

Figure 20:
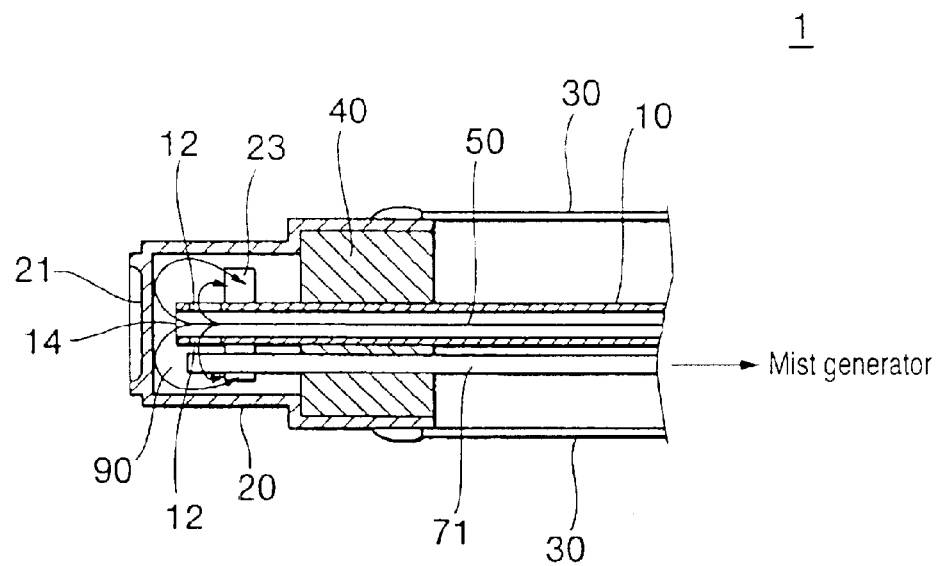
FIG. 20 is a cross-sectional view showing the thermo-welding equipment 1 according to Example 7.

In Example 6, in order to generate mist, a spray nozzle 70 is provided on the pipe 10 to turn cooling water provided in the nozzle 70 into mist by means of cooling air 50, and in Example 7, as shown in FIG. 20, a spray nozzle 71 is provided inside the heating element.

To the spray nozzle 71 is connected a feed water equipment 80 as in Example 6. With the configuration described above, by spraying cooling water via the spray nozzle 71, cooling air 50 and mist is mixed inside the heating element 20 to cool the same, which enables cooling in the same way as in Example 6, resulting in an efficient cooling effect.

As described above, the thermo-welding equipment used for a thermoplastic resin molded good according to the present invention has the configuration in which cooling air is blown onto all over the inside of a heating element, and mist turned from cooling water can be blown onto the same, allowing to obtain effects as follows:

a. to enable cooling time to be reduced because the entire heating element can be cooled,
b. to enable the total consumption of cooling air to be reduced because the consumption of cooling air that does not contribute to cooling can be eliminated,
c. to enable a heating element to cool within a shorter period of time compared to cooling with cooling air only because the vaporization heat of mist is utilized, and
d. to enable the state of mist generation to be controlled accurately because a feed water has a function of feeding water intermittently.

While specific embodiments of the invention have been shown and described in detail to illustrate the application of the principles of the invention, it will be understood that the invention may be embodied otherwise without departing from such principles.

What is claimed is:

1. A thermo-welding device for fixing a fixed object to a molded good, by inserting a welded boss formed on a molded good and made of thermoplastic resin into a fixing hole formed on the fixed object, heating and fusing a tip section of the welding boss projecting out from the fixing hole performing an expanded section outside of the fixed object, the welding device comprising:

a heating element having a periphery having an applying side with a shaped section for application to the welding boss of the molded good and for heating and fusing the welding boss, a portion of the periphery having a slit for discharging air from the inside of the heating element to outside of the heating element after the air is used for cooling; and a pipe for supplying cooling air into the inside of the heating element, said pipe having a lengthwise hole for blowing air onto a back of the applying side of said periphery of the heating element and said pipe having a widthwise hole for blowing air onto an internal surface of the heating element, said widthwise hole being in a shifted position at an angle not facing said slit.

2. A thermo-welding device according to claim 1, wherein said lengthwise hole and said widthwise hole are provided in a position adjacent to said applying side of said heating element and made such that an internal diameter of said lengthwise hole is smaller than that of said widthwise hole.

3. A thermo-welding device for a thermoplastic resin molded good for use upon inserting a welding boss formed on a molded good made of thermoplastic resin into a fixing hole formed on a fixed object and heating and fusing a tip section of the welding boss projecting out of the fixing hole for forming an exposed section outside the fixed object, the thermo-welding device comprising:

a heating element having a periphery with a portion having an applying side with a shaped section for application to the welding boss of the molded good and for heating and fusing the welding boss, said portion of said heating element having a slit for discharging air from an inside of said heating element to outside of said heating element after air is used for cooling;

a pipe for blowing air to an inside of said heating element to cool said heating element;

the supporting member provided for supporting a tip section of said pipe inserted into a rear of a through hole with a smaller diameter section formed in a portion of said tip section of said supporting member to maintain a gap with an internal backside of said heating element, said smaller diameter section having a lengthwise hole to blow air onto the backside of the heating element leading to said through hole and having a widthwise hole to blow air onto a side of said heating element, said lengthwise hole and said widthwise hole being provided in a position adjacent to said back of said applying side, said widthwise hole of said supporting member and slit of said heating element being set in a position not facing each other.

4. A thermo-welding device according to claim 3, wherein said lengthwise hole and said widthwise hole are provided in said supporting member and an internal diameter of said lengthwise hole is smaller than an internal diameter of said widthwise hole.

5. A thermo-welding device according to claim 3, wherein said lengthwise hole provided on said supporting member and an oblique hole are provided at a corner section on or adjacent to said back of said applying side of said heating element to blow air.

6. A thermo-welding device according to claim 3, further comprising a spray nozzle for spraying cooling water mixed with air.

7. A thermo-welding device according to claim 1, further comprising a spray nozzle for spraying cooling water mixed with air.

8. A thermo-welding device according to claim 3, further comprising a spray nozzle for spraying cooling water to an inside of said heating element.

9. A welding device according to claim 1, further comprising a spray nozzle for spraying cooling water to an inside of said heating element.

10. A thermo-welding device according to claim 6, further comprising a feed water device for intermittently supplying cooling water to said spray nozzle.

11. A thermo-welding device according to claim 7, further comprising a feed water device for intermittently supplying cooling water to said spray nozzle.

12. A thermo-welding device according to claim 8, further comprising:

a feed water device for intermittently supplying cooling water to said spray nozzle.

13. A thermo-welding device according to claim 9, further comprising a feed water device for intermittently supplying cooling water to said spray nozzle.

* * * * *